US012775943B2

(12) United States Patent
Takamoto et al.

(10) Patent No.: US 12,775,943 B2
(45) Date of Patent: Oct. 27, 2026

(54) INFORMATION PROVISION SYSTEM USING IMAGE DATE, INFORMATION PROVISION METHOD USING IMAGE DATE, AND NON-TRANSITORY STORAGE MEDIUM STORING INFORMATION PROVISION PROGRAM USING IMAGE DATE

(71) Applicant: NEC Corporation, Tokyo (JP)

(72) Inventors: Makoto Takamoto, Tokyo (JP); Hanae Shimomura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 410 days.

(21) Appl. No.: 18/018,637

(22) PCT Filed: Jul. 20, 2021

(86) PCT No.: PCT/JP2021/027159

§ 371 (c)(1),
(2) Date: Jan. 30, 2023

(87) PCT Pub. No.: WO2022/030247

PCT Pub. Date: Feb. 10, 2022

(65) Prior Publication Data

US 2023/0306421 A1 Sep. 28, 2023

(30) Foreign Application Priority Data

Aug. 3, 2020 (JP) ................................ 2020-131472

(51) Int. Cl.
*G06Q 20/38* (2012.01)
*G06F 3/01* (2006.01)
(Continued)

(52) U.S. Cl.
CPC ........... *G06Q 20/389* (2013.01); *G06F 3/013* (2013.01); *G06T 7/70* (2017.01); *G06V 40/20* (2022.01)

(58) Field of Classification Search
CPC ............. G06Q 20/389; G06Q 30/0202; G06Q 30/0251; G06Q 30/0255; G06Q 30/0269;
(Continued)

(56) References Cited

U.S. PATENT DOCUMENTS

2013/0085345 A1* 4/2013 Geisner .................. G06Q 30/00 600/300
2016/0171539 A1* 6/2016 Ganduri ............. G06Q 30/0255 705/14.53
2016/0196575 A1 7/2016 Uchida et al.

FOREIGN PATENT DOCUMENTS

JP 2009-151623 A 7/2009
JP 2014-056416 A 3/2014
(Continued)

OTHER PUBLICATIONS

International Search Report for PCT Application No. PCT/JP2021/027159, mailed on Oct. 12, 2021.

*Primary Examiner* — Ariel J Yu
*Assistant Examiner* — Denisse Y Ortiz Roman
(74) *Attorney, Agent, or Firm* — Sughrue Mion, P.LLC

(57) ABSTRACT

The present invention provides an information provision system (10) including: a determination unit (11) that determines an object of interest to a customer present in a facility among displayed articles present in the facility, based on attribute information of the customer; an estimation unit (12) that estimates the displayed article visually recognized by the customer, based on a content of behavior of the customer in the facility; a decision unit (13) that decides the displayed article of which information is provided to the customer, based on a result of the determination and a result of the estimation; and an output unit (14) that outputs information of the displayed article decided as an object of information provision.

9 Claims, 7 Drawing Sheets

(51) Int. Cl.
*G06T 7/70* (2017.01)
*G06V 40/20* (2022.01)

(58) Field of Classification Search
CPC ...... G06Q 30/0631; G06T 7/70; G06V 40/20; G06F 3/013
See application file for complete search history.

(56) References Cited

FOREIGN PATENT DOCUMENTS

| | | | | |
|---|---|---|---|---|
| JP | 2017117360 | A | * | 6/2017 |
| JP | 2020009147 | A | * | 1/2020 |
| JP | 2020-067986 | A | | 4/2020 |
| WO | 2015/033575 | A1 | | 3/2015 |

* cited by examiner

FIG. 7

FACILITY SETTING INFORMATION

- AIR CONDITIONER QUIET P313

TARGET : 20'S OR OVER, FEMALE

- AIR CONDITIONER POWERFUL 93X5SHS

TARGET : 20'S TO 40'S OR OVER, MALE

⋮

INFORMATION PROVISION SYSTEM USING IMAGE DATE, INFORMATION PROVISION METHOD USING IMAGE DATE, AND NON-TRANSITORY STORAGE MEDIUM STORING INFORMATION PROVISION PROGRAM USING IMAGE DATE

This application is a National Stage Entry of PCT/JP2021/027159 filed on Jul. 20, 2021, which claims priority from Japanese Patent Application 2020-131472 filed on Aug. 3, 2020, the contents of all of which are incorporated herein by reference, in their entirety.

TECHNICAL FIELD

The present invention relates to an information provision system, an information provision method, and a program.

BACKGROUND ART

A technique relevant to the present invention is disclosed in Patent Documents 1 and 2.

Patent Document 1 discloses a technique in which, after a position of a customer is determined based on position information of a cart or the like, information useful for the customer is selected based on a purchase history of the customer or the like from among pieces of information of a product arranged on a product shelf near the determined position, and the selected information is output toward the customer.

Patent Document 2 discloses a technique in which a position of a worker who is picking up a product is determined based on position information of a cart or the like, and, when the determined position approaches a display area of a product included in order data, an electronic tag of the product is caused to be blinked.

RELATED DOCUMENT

Patent Document

[Patent Document 1] Japanese Patent Application Publication No. 2014-56416

[Patent Document 2] Japanese Patent Application Publication No. 2009-151623

DISCLOSURE OF THE INVENTION

Technical Problem

When visiting a facility such as a store or an exhibition hall, a customer finds out an item in which the customer is interested from among a large number of displayed articles (products or exhibited articles) present in the facility, observes the item, and collects information of the item. However, human cognitive ability is limited. Thus, it is not easy to find out an item in which a customer is interested from among a large number of displayed articles present in a facility without omission.

As a means for solving the problem, for example, a means for estimating a displayed article in which a customer is interested from a purchase history of the customer or the like and outputting information of the displayed article at a timing when the customer approaches the displayed article is conceivable, as in the technique disclosed in Patent Document 1. However, outputting information of all the displayed articles in which the customer is interested causes information to be excessively output. Consequently, a burden on the customer who checks output information is increased, and besides, a problem such as overlooking the information itself may arise.

The present invention addresses a problem of providing a technique for appropriately selecting a displayed article of which information is to be provided to a customer from among displayed articles in which the customer is interested.

Solution to Problem

According to the present invention, provided is an information provision system including:

- a determination unit that determines an object of interest to a customer present in a facility among displayed articles present in the facility, based on attribute information of the customer;
- an estimation unit that estimates the displayed article visually recognized by the customer, based on a content of behavior of the customer in the facility;
- a decision unit that decides the displayed article of which information is provided to the customer, based on a result of the determination and a result of the estimation; and
- an output unit that outputs information of the displayed article decided as an object of information provision.

Further, according to the present invention, provided is an information provision method including,

- by a computer:
- determining an object of interest to a customer present in a facility among displayed articles present in the facility, based on attribute information of the customer;
- estimating the displayed article visually recognized by the customer, based on a content of behavior of the customer in the facility;
- deciding the displayed article of which information is provided to the customer, based on a result of the determination and a result of the estimation; and
- outputting information of the displayed article decided as an object of information provision.

Further, according to the present invention, provided is a program causing a computer to function as:

- a determination unit that determines an object of interest to a customer present in a facility among displayed articles present in the facility, based on attribute information of the customer;
- an estimation unit that estimates the displayed article visually recognized by the customer, based on a content of behavior of the customer in the facility;
- a decision unit that decides the displayed article of which information is provided to the customer, based on a result of the determination and a result of the estimation; and
- an output unit that outputs information of the displayed article decided as an object of information provision.

Advantageous Effects of Invention

According to the present invention, a technique for appropriately selecting an object of which information is to be provided to a customer from among displayed articles in which the customer is interested is achieved.

BRIEF DESCRIPTION OF THE DRAWINGS

FIG. 7 is a diagram schematically illustrating one example of information processed by the information provision system according to the present example embodiment.

DESCRIPTION OF EMBODIMENTS

Hereinafter, example embodiments of the present invention will be described by using the drawings. Note that, a similar component is assigned with a similar reference sign throughout all the drawings, and description therefor will be omitted as appropriate.

First Example Embodiment

<Overview>

First, an overview of an information provision system according to a present example embodiment will be described. The information provision system determines an object of interest to each customer present in a facility among displayed articles present in the facility, based on attribute information of each customer. Further, the information provision system estimates the displayed article visually recognized by each customer, based on a content of behavior of each customer in the facility. Then, the information provision system outputs, toward each customer, information of the displayed article not visually recognized by each customer among the displayed articles determined as the object of interest to each customer, that is, the displayed article overlooked by each customer among the displayed articles determined as the object of interest to each customer.

In this way, the information provision system outputs, toward a customer, information of a displayed article overlooked by the customer among objects of interest (displayed articles) to the customer, rather than provide information of all the objects of interest to the customer among the displayed articles present in a facility. The information provision system enables appropriately choosing an object of which information is to be provided to a customer from among displayed articles in which the customer is interested. Consequently, inconvenience that information is excessively output toward a customer can be prevented.

<Hardware Configuration>

Next, one example of a hardware configuration of the information provision system will be described. Each function unit included in the information provision system is achieved by any combination of hardware and software, mainly including a central processing unit (CPU) of any computer, a memory, a program to be loaded in a memory, a storage unit (in which a program downloaded from a storage medium such as a compact disc (CD), a server on the Internet, or the like can be stored as well as a program stored in advance in a stage of shipping the apparatus) such as a hard disk for storing the program, and an interface for network connection. In addition, it should be understood by a person skilled in the art that there are a variety of modification examples of a method or an apparatus for achieving the same.

Figure 1:
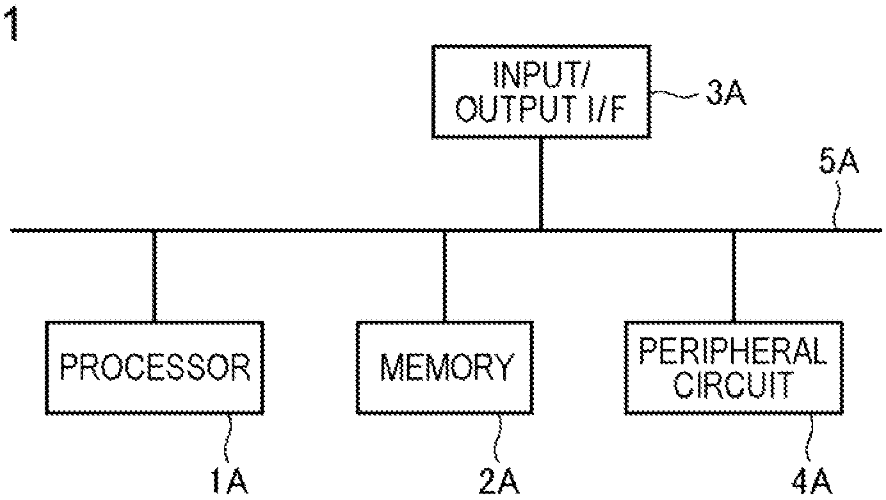
FIG. 1 is a diagram illustrating one example of a hardware configuration of an apparatus according to a present example embodiment.

The information provision system may be configured by a plurality of physically and/or logically separated apparatuses, or may be configured by one physically and logically unified apparatus. FIG. 1 is a diagram illustrating a hardware configuration example of each apparatus. As illustrated in FIG. 1, each apparatus includes a processor 1A, a memory 2A, an input/output interface 3A, a peripheral circuit 4A, and a bus 5A. The peripheral circuit 4A includes various modules. Note that, each apparatus may not include the peripheral circuit 4A.

The bus 5A is a data transmission path through which the processor 1A, the memory 2A, the peripheral circuit 4A, and the input/output interface 3A transmit and receive data to and from one another. The processor 1A is an arithmetic processing apparatus such as, for example, a CPU or a graphics processing unit (GPU). The memory 2A is a memory such as, for example, a random access memory (RAM) or a read only memory (ROM). The input/output interface 3A includes an interface for acquiring information from an input apparatus, an external apparatus, an external server, an external sensor, and the like, an interface for outputting information to an output apparatus, an external apparatus, an external server, and the like, and the like. The input apparatus is, for example, a keyboard, a mouse, a microphone, and the like. The output apparatus is, for example, a display, a speaker, a printer, a mailer, and the like. The processor 1A can give an instruction to each module to perform an operation, based on an operation result thereof <Function Configuration>

Figure 2:
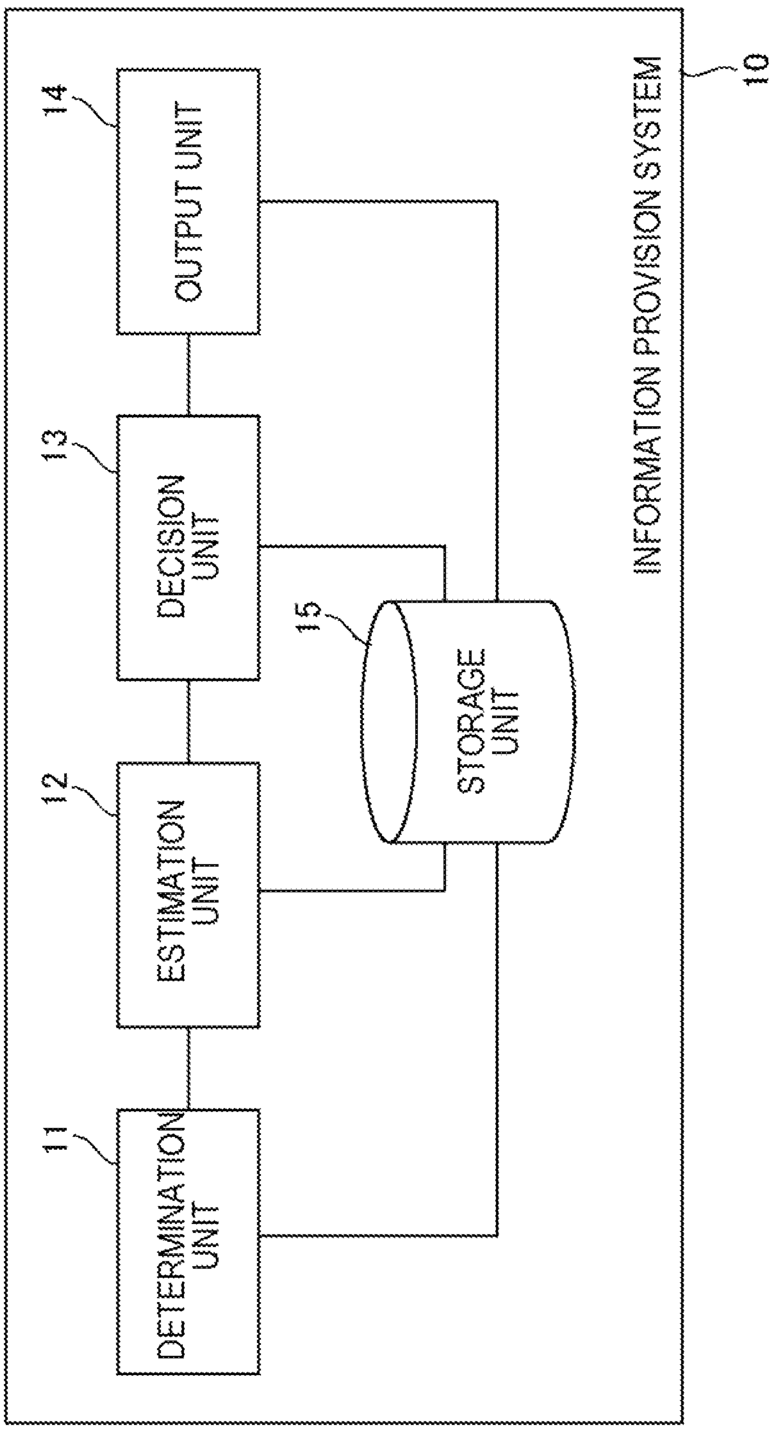
FIG. 2 is one example of a function block diagram of an information provision system according to the present example embodiment.

Next, one example of a function configuration of the information provision system will be described. As illustrated in FIG. 2, an information provision system 10 includes a determination unit 11, an estimation unit 12, a decision unit 13, an output unit 14, and a storage unit 15. Note that, the information provision system 10 may not include the storage unit 15. In this case, an external apparatus configured communicably with the information provision system 10 includes the storage unit 15.

By the function units included in the information provision system 10, (1) processing of determining and managing a customer coming to a facility, (2) processing of determining an object of interest to a customer, (3) processing of estimating a displayed article visually recognized by a customer, and (4) processing of deciding and outputting an object of which information is provided are executed. Hereinafter, description will be given for each processing.

"(1) Processing of Determining and Managing a Customer Coming to a Facility"

The determination unit 11 determines, based on information acquired by an information acquisition apparatus, a customer coming to a facility and manages the determined customer with customer identification information.

The facility is a facility where a plurality of displayed articles are present and a customer can visually recognize his/her favorite displayed article while moving, and examples thereof include a store and an exhibition hall. The displayed article is an article displayed in the facility. When the facility is a store, the displayed article is a product displayed in the store. When the facility is an exhibition hall, the displayed article is an exhibited article displayed in the exhibition hall.

The information acquisition apparatus is an apparatus that acquires information relevant to a customer. The information acquisition apparatus can include at least one of a camera, a short-range wireless communication apparatus, a customer operation terminal, and a server.

The camera is installed in a position and a direction capable of photographing a face of a customer coming to a facility, and generates a face image of the customer. The short-range wireless communication apparatus is installed in a facility, performs short-range wireless communication with a customer's belonging (a smartphone, a smartwatch, a tablet terminal, an IC card, or the like), and acquires member identification information stored in the customer's belonging. The customer operation terminal is installed in a facility, and accepts an input of member identification information via a predetermined input apparatus (a touch panel or the like). The server communicates with a customer's belonging (a smartphone, a smartwatch, a tablet terminal, or the like) via a communication network such as the Internet, and acquires position information of the customer's belonging. The customer's belonging can acquire position information of an own terminal by using every possible technique such as a global positioning system (GPS).

The member identification information is information for identifying a customer who is registered as a member. The member identification information is given to a customer by performing member registration according to a predetermined procedure. Member registration, a method of managing the member identification information, and the like can be achieved by employing every possible conventional technique.

Note that, a customer determined as coming to a facility is managed with customer identification information, as described above. That is, the customer identification information is information for mutually identifying customers coming to a facility. For example, the customer identification information of a customer determined as coming to a facility is registered in customer-in-facility management information for managing a customer in the facility. In the present example embodiment, the above-described member identification information is used as the customer identification information. Note that, another means may be employed, such as newly issuing customer identification information to each of customers coming to a facility and registering the customer identification information in association with the member identification information.

Figure 3:
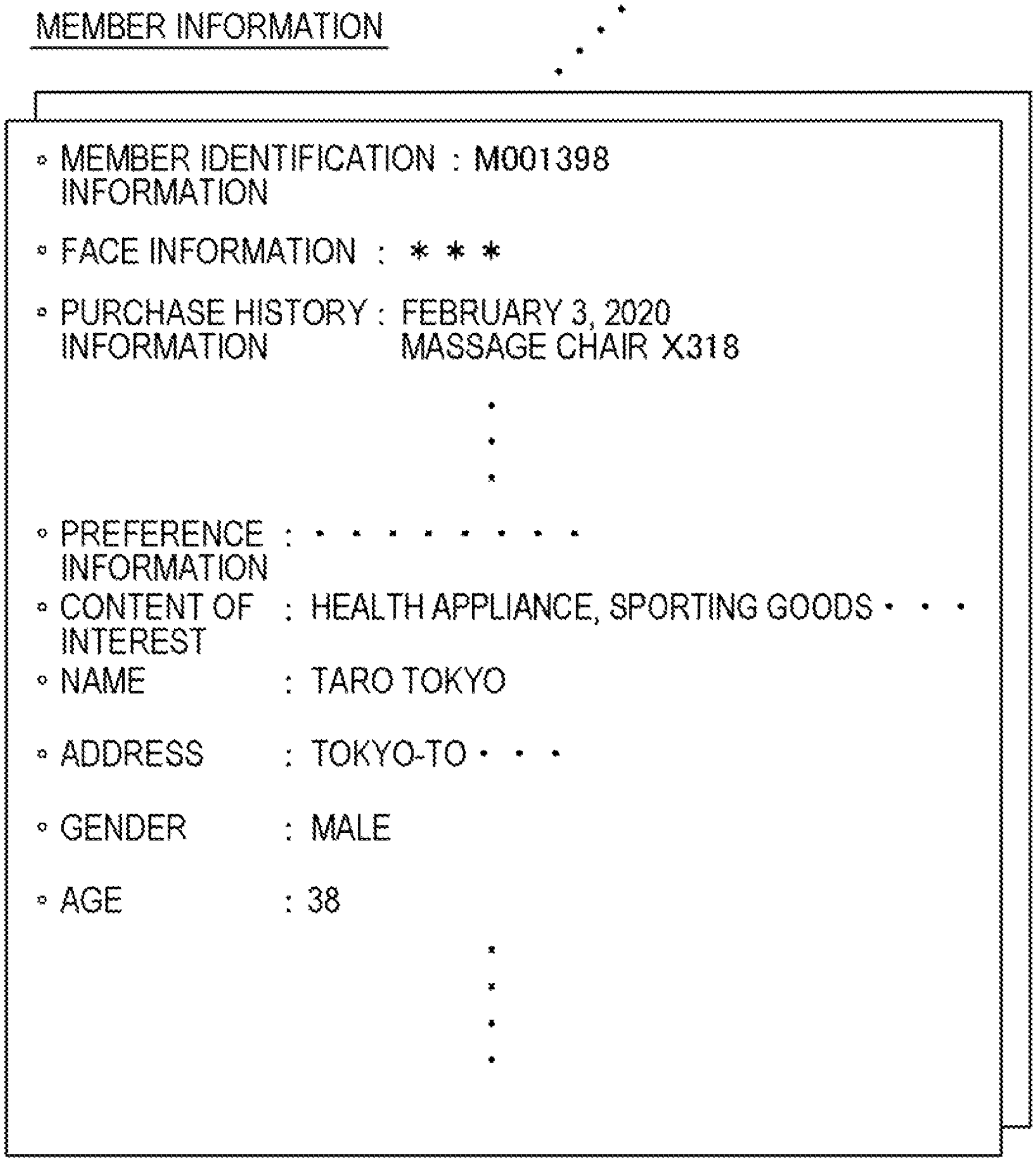
FIG. 3 is a diagram schematically illustrating one example of information processed by the information provision system according to the present example embodiment.

Herein, FIG. 3 schematically illustrates one example of member information stored in the storage unit 15. The illustrated member information includes member identification information, face information, purchase history information, preference information, a content of interest, a name, an address, a gender, an age, and the like. Note that, the member information may not include part of the examples, or may include other information.

The member identification information is information for mutually identifying members.

The face information is a face photograph and/or a feature value of a face appearance extracted from the face photograph.

The purchase history information is information indicating a past purchased product and a date of purchase.

The preference information is information indicating preference of a customer computed by arithmetic processing of a computer from the purchase history information. Computation of the preference information can be achieved by employing every possible conventional technique. For example, a frequently purchased manufacturer's name, a product type, a price range, and the like are computed.

The content of interest is information that is registered by a customer him/herself, and indicates a content in which the customer is currently interested. For example, a manufacturer's name, a product type, a price range, a type of an exhibited article (painting, photography, pottery, or the like), an artist's name, year/month/day of creation of an artwork, and the like can be registered.

The name, the address, the gender, and the age are a name, an address, a gender, and an age of a customer.

Acquisition and management of these pieces of information can be achieved by employing every possible conventional technique.

Next, one example of processing of the determination unit 11 when each of a camera, a short-range wireless communication apparatus, a customer operation terminal, and a server is used as an information acquisition apparatus will be described.

When a camera is used as an information acquisition apparatus, the camera is installed at an entrance of a facility, in a facility, or at any place around a facility. Then, the determination unit 11 performs authentication (face authentication) of a customer coming to the facility, by collation processing based on a face image of the customer generated by the camera and information (member information, see FIG. 3) of a customer already registered as a member. Then, when succeeding in the authentication, the determination unit 11 registers member identification information of the customer in customer-in-facility management information for managing a customer in the facility.

Further, the camera is installed at an exit of a facility, in a facility, or at any place around a facility. Then, the determination unit 11 determines member identification information of a customer leaving from the facility, by collation processing based on a face image of the customer generated by the camera and information (member information, see FIG. 3) of a customer already registered as a member. Then, the determination unit 11 deletes the determined member identification information from customer-in-facility management information.

When a short-range wireless communication apparatus is used as an information acquisition apparatus, the short-range wireless communication apparatus is installed at an entrance of a facility, in a facility, or at any place around a facility. Then, the determination unit 11 performs authentication of a customer coming to the facility, by collation processing based on member identification information acquired by the short-range wireless communication apparatus and information (member information, see FIG. 3) of a customer already registered as a member. Then, when succeeding in the authentication, the determination unit 11 registers member identification information of the customer in customer-in-facility management information for managing a customer in the facility.

Further, the short-range wireless communication apparatus is installed at an exit of a facility, in a facility, or at any place around a facility. Then, the determination unit 11 determines member identification information of a customer leaving from the facility, by collation processing based on member identification information acquired by the short-range wireless communication apparatus and information (member information, see FIG. 3) of a customer already registered as a member. Then, the determination unit 11 deletes the determined member identification information from customer-in-facility management information.

When a customer operation terminal is used as an information acquisition apparatus, the customer operation terminal is installed at an entrance of a facility, in a facility, or at any place around a facility. Then, the determination unit 11 performs authentication of a customer coming to the facility, by collation processing based on member identification information input by a user to the customer operation terminal and information (member information, see FIG. 3) of a customer already registered as a member. Then, when succeeding in the authentication, the determination unit 11 registers member identification information of the customer in customer-in-facility management information for managing a customer in the facility.

Further, the customer operation terminal is installed at an exit of a facility, in a facility, or at any place around a facility. Then, the determination unit 11 determines member identification information of a customer leaving from the facility, by collation processing based on member identification information input by a user to the customer operation terminal and information (member information, see FIG. 3) of a customer already registered as a member. Then, the determination unit 11 deletes the determined member identification information from customer-in-facility management information.

When a server is used as an information acquisition apparatus, the determination unit 11 detects presence of a customer in a facility, by collation between position information of a customer's belonging acquired by the server and position information of the facility. Then, the determination unit 11 registers member identification information of the customer whose presence in the facility is detected, in customer-in-facility management information for managing a customer in the facility.

Further, the determination unit 11 detects leaving of a customer from a facility, by collation between position information of a customer's belonging acquired by the server and position information of the facility. Then, the determination unit 11 deletes member identification information of the customer whose leaving from the facility is detected from customer-in-facility management information.

Note that, the information provision system 10 may achieve determination of a customer coming to a facility and determination of a customer leaving a facility by using a plurality of types of information acquisition apparatuses with a plurality of types of approaches. Further, the information provision system 10 may achieve determination of a customer coming to a facility and determination of a customer leaving a facility by employing other approaches not exemplified herein.

"(2) Processing of Determining an Object of Interest to a Customer"

The determination unit 11 determines an object of interest to each customer present in a facility among displayed articles present in the facility, based on attribute information of each customer.

Figure 4:
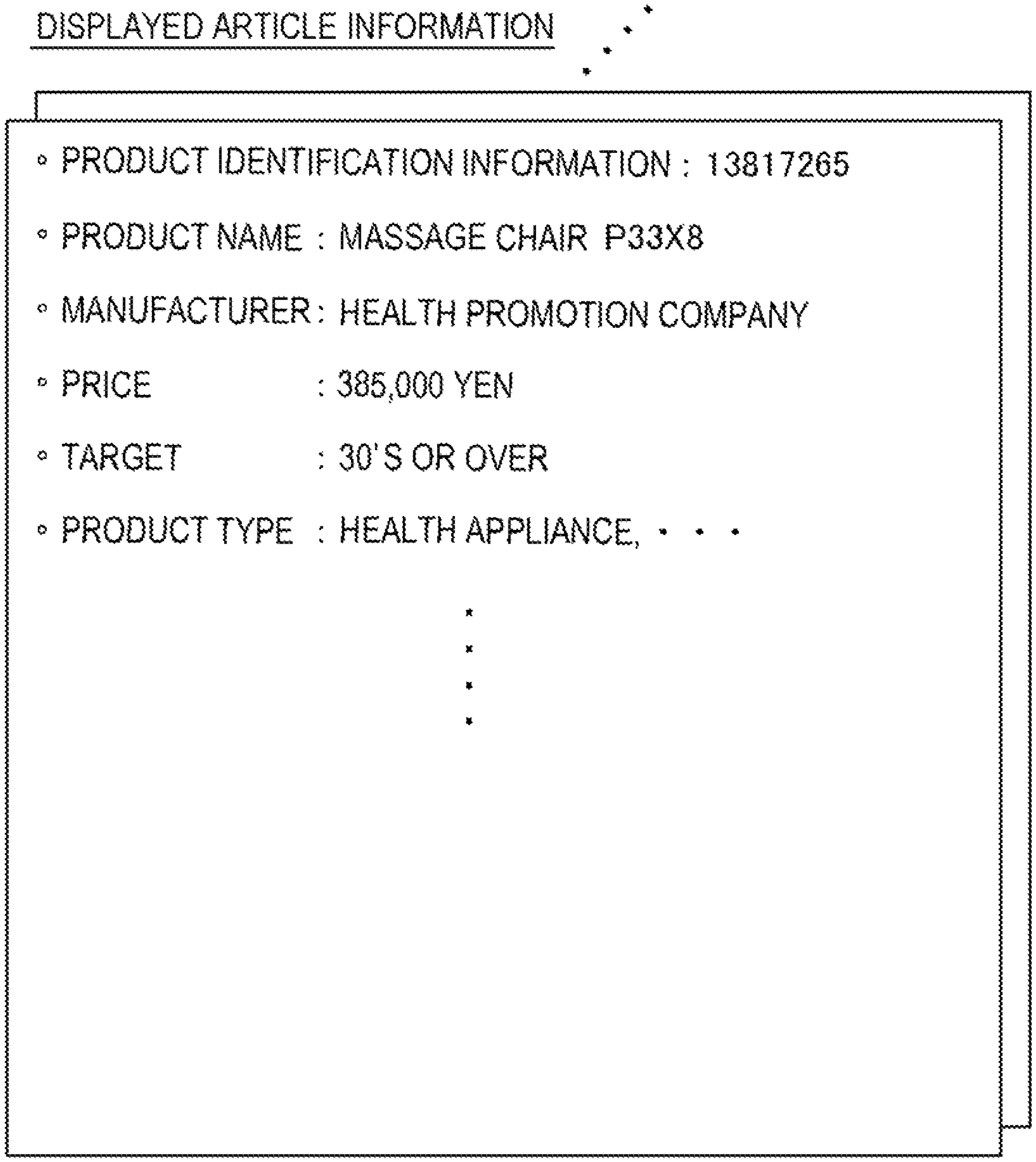
FIG. 4 is a diagram schematically illustrating one example of information processed by the information provision system according to the present example embodiment.
Figure 5:
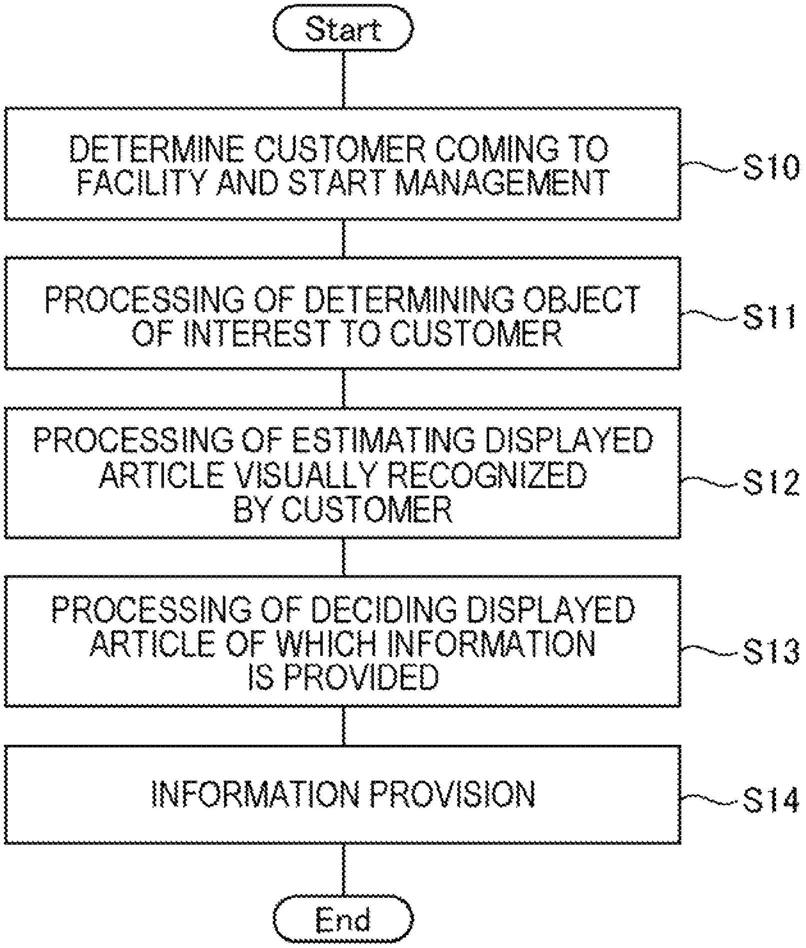
FIG. 5 is a flowchart illustrating one example of a flow of processing of the information provision system according to the present example embodiment.

A list of displayed articles present in a facility is present in advance (see FIG. 4). In the list, detailed information (a product type, a price range, a manufacturer, a type of an exhibited article (painting, photography, pottery, or the like), an artist's name, year/month/day of creation, and the like) of each displayed article is registered. Then, the determination unit 11 determines an object of interest to a customer from among displayed articles included in the list, based on the detailed information of the displayed article and attribute information of the customer.

The attribute information includes at least one of a past purchase history of each customer, preference information of each customer generated from the purchase history, a content of interest registered by each customer, a purchase history of another customer whose predetermined attribute (an age, a gender, or the like) is similar to each customer, preference information of the another customer, a content of interest to the another customer, and a content of behavior of each customer in a facility.

Herein, a specific example of processing of determining an object of interest to a customer will be described. The determination unit 11 can determine an object of interest to a customer by employing, for example, one or a plurality of a plurality of processing examples exemplified below.

"(2-1) First Processing Example"

The determination unit 11 determines an object of interest to a customer from among displayed articles, based on a past purchase history of the customer and detailed information of the displayed article.

For example, a product that has been purchased in the past of a manufacturer that has been purchased in the past may be determined as an object of interest, or a product (of the same type, the same manufacturer, the same price range, or the like) relevant to the product may be determined as an object of interest. The "past purchase" may be "once", or conditions such as "a plurality of times", "purchase within a most recent predetermined period of time", and "purchase for a plurality of times within a most recent predetermined period of time" may be added. Note that, the exemplification is merely one example, and an object of interest to a customer can be determined by using other algorithms from among displayed articles, based on a past purchase history of the customer and detailed information of the displayed article.

"(2-2) Second Processing Example"

The determination unit 11 determines an object of interest to a customer from among displayed articles, based on preference information of the customer and detailed information of the displayed article. A technique for selecting a recommended product to a customer from among a plurality of products based on preference information of the customer is widely known. The determination unit 11 can achieve the determination by using the technique.

"(2-3) Third Processing Example"

The determination unit 11 determines an object of interest to a customer from among displayed articles, based on a content of interest registered by the customer and detailed information of the displayed article. The content of interest registered by the customer includes, for example, a manufacturer's name, a product type, a price range, a type of an exhibited article (painting, photography, pottery, or the like), an artist's name, year/month/day of creation of an artwork, and the like. The determination unit 11 determines, as an object of interest, a displayed article that matches the condition registered by the customer (matches at least one or all of the registered conditions, or the like).

"(2-4) Fourth Processing Example"

The determination unit 11 acquires a past purchase history, preference information, and/or a content of interest to another customer whose attribute (a gender or an age group) is similar to a customer to be processed. Then, the determination unit 11 determines an object of interest to the customer to be processed, based on the past purchase history, the preference information, and/or the content of interest to the another customer, in a way similar to the first processing example to the third processing example. The processing is effective when, for example, a past purchase history, preference information, a content of interest, and the like of a customer to be processed are not registered. The determination unit 11 may execute the fourth processing example when a past purchase history, preference information, a content of interest, and the like of a customer to be processed are not registered.

"(2-5) Fifth Processing Example"

The determination unit 11 determines an object of interest, based on a content of behavior of a customer in a facility. The content of behavior of the customer is determined by analyzing information generated by an information acquisition apparatus such as a camera installed in a facility. First, a customer who is behaving in a facility is determined, by face authentication using an image generated by a camera and authentication based on member identification information acquired by a short-range wireless communication apparatus from a customer's belonging (a smartphone, a smartwatch, a tablet terminal, an IC card, or the like). Then, behavior of the customer present in the image generated by the camera can be determined by analyzing the image.

For example, the determination unit 11 can determine an object of interest to a customer, based on a line of movement of the customer in a facility. As one example, the determination unit 11 may determine, as an object of interest, a displayed article that is displayed near (in front of, around, or the like) a place where a customer stands still for a predetermined period of time or more and a displayed article (of the same type, the same manufacturer, the same price range, the same artist, or the like) relevant thereto. A displayed article that is displayed near (in front of, around, or the like) a predetermined place may be determined based on layout information of a facility prepared in advance, or may be determined by recognizing, by means of image analysis, a displayed article that is displayed near (in front of, around, or the like) a predetermined place.

Besides the above, the determination unit 11 can determine an object of interest to a customer, based on a line of sight of the customer in a facility. As one example, the determination unit 11 may determine, as an object of interest, a displayed article that is visually recognized by a customer and a displayed article (of the same type, the same manufacturer, the same price range, the same artist, or the like) relevant thereto. A displayed article ahead of a line of sight of a customer may be determined based on layout information of a facility prepared in advance, or may be determined by recognizing, by means of image analysis, a displayed article present ahead of a line of sight.

Besides the above, the determination unit 11 can determine an object of interest to a customer, based on predetermined behavior indicating interest in a displayed article. The predetermined behavior is behavior of trying a displayed article (sitting on a massage chair, sitting on a chair, eating a sample, or the like), behavior of touching a displayed article, behavior of picking up a displayed article, or the like. The determination unit 11 may determine, as an object of interest, a displayed article that is an object of the predetermined behavior and a displayed article (of the same type, the same manufacturer, the same price range, the same artist, or the like) relevant thereto. A displayed article that is an object of predetermined behavior may be determined by recognizing the displayed article by means of image analysis.

"(3) Processing of Estimating a Displayed Article Visually Recognized by a Customer"

The estimation unit 12 estimates a displayed article visually recognized by each customer, based on a content of behavior of each customer in a facility. The content of behavior of the customer is determined by analyzing information generated by an information acquisition apparatus such as a camera installed in a facility. First, a customer who is behaving in a facility is determined, by face authentication using an image generated by a camera and authentication based on member identification information acquired by a short-range wireless communication apparatus from a customer's belonging (a smartphone, a smartwatch, a tablet terminal, an IC card, or the like). Then, behavior of the customer present in the image generated by the camera can be determined by analyzing the image.

The estimation unit 12 estimates a displayed article visually recognized by each customer, based on at least one of a line of movement, a line of sight, and an orientation of a face of each customer in a facility. The estimation unit 12 can estimate a displayed article visually recognized by a customer by employing, for example, one or a plurality of a plurality of processing examples exemplified below.

"(3-1) First Processing Example"

For example, the estimation unit 12 can determine a displayed article (a displayed article positioned ahead of a line of sight) viewed by each customer, based on a line of sight. The estimation unit 12 may determine, as a visually recognized displayed article, a displayed article viewed by a customer. Note that, a "displayed article viewed by a customer" may be replaced with a condition such as a "displayed article viewed by a customer for a predetermined period of time or more", a "displayed article viewed by a customer in a state of stand-still", a "displayed article viewed by a customer in a state of stand-still for a predetermined period of time or more", a "displayed article viewed by a customer in motion at a velocity of a predetermined value or less", or a "displayed article viewed by a customer in motion at a velocity of a predetermined value or less for a predetermined period of time or more". Detection of a line of sight can be achieved by using every possible conventional technique. A displayed article ahead of a line of sight of a customer may be determined based on layout information of a facility prepared in advance, or may be determined by recognizing, by means of image analysis, a displayed article present ahead of a line of sight.

"(3-2) Second Processing Example"

Besides the above, the estimation unit 12 can estimate a displayed article (a displayed article positioned ahead of a line of sight) viewed by each customer, based on an orientation of a face. The estimation unit 12 may determine, as a visually recognized displayed article, a displayed article estimated as viewed by a customer. Note that, a "displayed article estimated as viewed by a customer" may be replaced with a condition such as a "displayed article estimated as viewed by a customer for a predetermined period of time or more", a "displayed article estimated as viewed by a customer in a state of stand-still", a "displayed article estimated as viewed by a customer in a state of stand-still for a predetermined period of time or more", a "displayed article estimated as viewed by a customer in motion at a velocity of a predetermined value or less", or a "displayed article estimated as viewed by a customer in motion at a velocity of a predetermined value or less for a predetermined period of time or more". Detection of an orientation of a face can be achieved by using every possible conventional technique. A displayed article ahead of an orientation of a face may be determined based on layout information of a facility prepared in advance, or may be determined by recognizing, by means of image analysis, a displayed article present ahead of an orientation of a face.

"(3-3) Third Processing Example"

Besides the above, the estimation unit 12 estimates a displayed article visually recognized by each customer, based on a line of movement in a facility. For example, the estimation unit 12 may determine, as a displayed article visually recognized by each customer, a displayed article that is displayed near (in front of, around, or the like) a place where a customer stands still. Note that, a "place where a customer stands still" may be replaced with a condition such as a "place where a customer stands still for a predetermined period of time or more". Besides the above, the estimation unit 12 may determine, as a displayed article visually recognized by each customer, a displayed article that is displayed on a passage through which a customer has passed. The estimation unit 12 may determine a displayed article that is displayed near (in front of, around, or the like) a predetermined place or on a predetermined passage, based on layout information of a facility generated in advance. Besides the above, the estimation unit 12 may determine a displayed article that is displayed near (in front of, around, or the like) a predetermined place or on a predetermined passage, by analyzing information generated by an information acquisition apparatus such as a camera installed in a facility.

"(4) Processing of Deciding and Outputting an Object of Which Information is Provided"

The decision unit 13 decides a displayed article of which information is provided to each customer, based on a result (an object of interest to each customer among displayed articles) determined by the determination unit 11 and a result (a displayed article visually recognized by each customer) estimated by the estimation unit 12. The decision unit 13 decides, as an object of information provision, a displayed article not visually recognized by each customer among displayed articles determined as an object of interest to each customer. Note that, when a facility is a store, the decision unit 13 may refer to product stock information of the store, and may decide only a displayed article in stock as an object of information provision. By doing so, inconvenience that information relating to a displayed article running out of stock is provided can be prevented.

The output unit 14 outputs information of a displayed article (hereinafter, a "first displayed article") decided as an object of information provision. The "information of the first displayed article" to be output can include a name of the first displayed article, detailed information (a type, a manufacturer, a price range, an artist's name, and the like) of the first displayed article, information indicating a display position of the first displayed article in a facility, and the like.

Next, one example of a method of outputting information will be described. Note that, the method is not limited to the example herein. The output unit 14 may transmit information of a first displayed article toward a customer by e-mail by using an e-mail address registered in advance as member information. Besides the above, the output unit 14 may transmit information of a first displayed article toward a customer by push notification using an application. Besides the above, the output unit 14 may save information of a first displayed article on a predetermined server, and may set the information of the first displayed article into a state viewable on a predetermined web site or a predetermined member page in an application. Then, the output unit 14 may notify, by e-mail, push notification, or the like, a customer that information of a new first displayed article is made viewable.

Besides the above, the output unit 14 may output information of a first displayed article via an output apparatus (a display, a projection apparatus, or the like) installed in a facility. In this case, the output unit 14 recognizes a customer near the output apparatus, by face authentication using an image generated by a camera installed near the output apparatus and authentication based on member identification information acquired by a short-range wireless communication apparatus from a customer's belonging (a smartphone, a smartwatch, a tablet terminal, an IC card, or the like) (determination of customer identification information). Then, the output unit 14 outputs, via the output apparatus, information of a first displayed article decided associated with the recognized customer.

Besides the above, the output unit 14 may output information of a first displayed article via an output apparatus (a price tag, a lamp, a speaker, or the like) installed in a facility in association with each displayed article. In this case, the output unit 14 recognizes a customer near the output apparatus, by face authentication using an image generated by a camera installed near the output apparatus and authentication based on member identification information acquired by a short-range wireless communication apparatus from a customer's belonging (a smartphone, a smartwatch, a tablet terminal, an IC card, or the like) (determination of customer identification information). Then, the output unit 14 turns on/blinks the price tag or the lamp associated with a first displayed article decided associated with the recognized customer, or outputs a notification sound from the speaker.

Next, one example of a timing of outputting information of a first object of recognition will be described. The output unit 14 can output information of a first object of recognition at a timing of at least one of following examples.

"(4-1) First Output Timing Example"

The output unit 14 can output information of a first displayed article decided as an object of information provision at a timing of detecting a customer passing in front of a display position of the first displayed article without visually recognizing the first displayed article. For example, the output unit 14 can output information of a displayed article (a first displayed article) that is determined as an object of interest and is not visually recognized by a customer by the point in time, at a timing of detecting the customer passing in front of a display position of the first displayed article without visually recognizing the first displayed article.

There are various algorithms for detecting a customer passing in front of a display position of a predetermined first displayed article. For example, the algorithms may be achieved by detecting that a distance between the customer and the display position of the first displayed article becomes within a reference value and thereafter (the customer and the first displayed article become close to each other and thereafter) the distance between the customer and the display position of the first displayed article becomes larger than the reference value (the customer and the first displayed article become apart from each other). By combining the condition with a condition such as "the customer does not stand still when a distance between the customer and the display position of the first displayed article is within a reference value" or "a line of sight or an orientation of a face of the customer is not directed toward the first displayed article" as an AND condition, "the customer is passing without visually recognizing the first displayed article" is detected.

In a case of the example, information of a first displayed article may be output toward a customer by using e-mail or push notification of an application. Alternatively, a price tag or a lamp installed associated with a first displayed article that a customer passes without visually recognizing the first displayed article may be turned on/blinked, or a notification sound may be output from a speaker.

In a case of the example, since a customer is notified of information of a predetermined first displayed article at a timing of passing the first displayed article without visually recognizing the first displayed article, the customer can recognize overlooking at a timing of passing the first displayed article. Consequently, this enables the customer to visually recognize the overlooked first displayed article at a time of visiting the facility.

"(4-2) Second Output Timing Example"

The output unit 14 can output information of a first displayed article at a timing of detecting a customer leaving from a facility. Detection of a customer leaving from a facility may be achieved by face authentication based on an image generated by a camera installed at an exit of the facility, may be achieved by accepting an input of member identification information with a short-range wireless communication apparatus installed at an exit of the facility or a customer operation terminal, or may be achieved based on position information of a customer's belonging acquired from the customer's belonging.

In a case of the example, information of a first displayed article may be output by using e-mail or push notification of an application. Besides the above, information of a first displayed article may be output via an output apparatus (a display, a projection apparatus, or the like) installed at an exit.

In a case of the example, since a customer is notified of information of a first displayed article at a timing of detecting the customer leaving from a facility, the customer can recognize overlooking at a timing of being not too far from the facility. Consequently, this enables the customer to return to the facility and visually recognize the overlooked first displayed article.

"(4-3) Third Output Timing Example"

The output unit 14 can output information of a first displayed article at a timing of detecting a customer who has finished an activity of visually recognizing a displayed article in a facility at a predetermined position where the customer is to pass. The predetermined position can be decided for each facility, according to a type of a facility, a structure of a facility, or the like. The predetermined position may be, for example, a predetermined passage, may be a predetermined gate, or may be a predetermined area.

For example, when a facility is a store, a place where an accounting apparatus is installed is exemplified. Detection of a customer coming to the place is achieved by, for example, face authentication using an image generated by a camera installed at the place and authentication based on member identification information acquired by a short-range wireless communication apparatus from a customer's belonging (a smartphone, a smartwatch, a tablet terminal, an IC card, or the like). For example, a customer may be detected coming to an accounting area (an area for performing accounting processing, where an accounting apparatus is installed) in a store defined in advance. Besides the above, the output unit 14 may analyze an image and output information of a first displayed article at a timing of detecting a customer standing in a checkout line. Detection of a customer standing in a checkout line may be achieved by detecting a customer standing still at an end of the line, or may be achieved by other algorithms.

In a case of the example, since a customer is notified of information of a first displayed article at a timing when the customer who has finished an activity of visually recognizing a displayed article comes to a predetermined position in a facility where the customer is to pass, the customer can recognize overlooking when being in the facility. Consequently, this enables the customer to visually recognize the overlooked first displayed article at a time of visiting the facility.

"(4-4) Fourth Output Timing Example"

The output unit 14 can output information of a first displayed article decided as an object of information provision, at a timing of detecting that a distance between a display position of the first displayed article and a customer is within a reference distance, and that a duration of a state of not detecting the customer visually recognizing the first displayed article reaches a reference period of time. Detection of the state is achieved by analyzing an image generated by a camera installed in a facility.

In a case of the example, information of a first displayed article may be output toward a customer by using e-mail or push notification of an application. Alternatively, a price tag or a lamp installed associated with the first displayed article may be turned on/blinked, or a notification sound may be output from a speaker.

In a case of the example, a customer can recognize overlooking when being near a predetermined first displayed article. Consequently, this enables the customer to visually recognize the overlooked first displayed article at a time of visiting the facility.

"(4-5) Fifth Output Timing Example"

The output unit 14 can output information of a first displayed article at a predetermined time of a day when a customer comes to a facility. The time may be set by each customer, may be set by a manager of a facility, or may be set by a manager of the information provision system 10.

In a case of the example, depending on the time, there is a possibility that information of a first displayed article may be output after a lapse of considerably long time since a customer leaves a facility. In this case, the customer cannot visually recognize the overlooked first displayed article at a time of visiting the facility. However, it is expected that the customer feels like going to the facility again by visually recognizing the overlooking.

"(4-6) Sixth Output Timing Example"

The output unit 14 can output information of a first displayed article at a predetermined time of a predetermined day. The day and the time may be set by each customer, may be set by a manager of a facility, or may be set by a manager of the information provision system 10. The day may be specified by day of week, or may be specified by date such as 5th, 10th, 15th, 20th, 25th, and 30th.

In a case of the example, depending on the date and the time, there is a possibility that information of a first displayed article may be output after a lapse of considerably long time since a customer leaves a facility. In this case, the customer cannot visually recognize the overlooked first displayed article at a time of visiting the facility. However, it is expected that the customer feels like going to the facility again by visually recognizing the overlooking. Further, by specifying the date, frequency of outputting information can be reduced, and inconvenience that the customer feels annoyed can be prevented.

"(4-7) Seventh Output Timing Example"

The determination unit 11 can determine a timing when each customer indicates interest in a first displayed article, based on attribute information of each customer. Then, the output unit 14 can output information of the first displayed article at the determined timing. The attribute information used herein is, for example, at least either a past purchase history or an event day registered by a customer as member information.

For example, the determination unit 11 computes a purchase frequency (once a week, once a month, or the like) of each type of products (soy source, detergent, milk, and the like), based on a purchase history of each customer. Then, the determination unit 11 computes an expected date of next purchase (a timing of indicating interest), based on the computed purchase frequency and a most recent date of purchase. Then, the output unit 14 outputs information of a first displayed article on the computed expected date of purchase or on a date a predetermined number of days prior thereto.

As another example, the determination unit 11 determines a registered event day as a timing when each customer indicates interest in a first displayed article. Then, the output unit 14 outputs information of the first displayed article on the determined event day or on a date a predetermined number of days prior thereto.

The event day is, but not limited thereto, a payday, a family's birthday, a wedding anniversary, or the like. For example, the determination unit 11 may determine a payday as a timing when a customer indicates interest in a first displayed article in a price range equal to or more than a reference value. Further, the determination unit 11 may determine a family's birthday, a wedding anniversary, or the like as a timing when a customer indicates interest in a first displayed article belonging to a gift. Note that, the event days may be registered by a customer him/herself, or may be determined by a computer leaning from a past behavior history (a purchase history or the like) or the like, as described above.

In a case of the example, there is a possibility that information of a first displayed article may be output after a lapse of considerably long time since a customer leaves a facility. In this case, the customer cannot visually recognize the overlooked first displayed article at a time of visiting the facility. However, it is expected that the customer feels like going to the facility again by visually recognizing the overlooking. Further, by outputting information at a timing when the customer indicates interest, it is expected that the customer strongly feels like going to the facility again.

Herein, one example of a flow of processing of the information provision system 10 will be described.

First, the determination unit 11 determines a customer coming to a facility, and starts management (S10). The processing is as described in "(1) processing of determining and managing a customer coming to a facility" described above.

Next, the determination unit 11 determines an object of interest to the customer present in the facility among displayed articles present in the facility, based on attribute information of the customer (S11). The processing is as described in "(2) processing of determining an object of interest to a customer" described above.

Next, the estimation unit 12 estimates the displayed article visually recognized by the customer, based on a content of behavior of the customer in the facility (S12). The processing is as described in "(3) processing of estimating a displayed article visually recognized by a customer" described above.

Note that, processing order of the processing in S11 and the processing in S12 is not limited thereto. For example, the processing in S11 may be performed after the processing in S12. Further, the processing in S11 and the processing in S12 may be performed in parallel.

Next, the decision unit 13 decides the displayed article of which information is provided to the customer, based on a result of the determination in S11 and a result of the estimation in S12 (S13). The decision unit 13 decides, as the displayed article of which information is provided, the displayed article not visually recognized by the customer among the displayed articles determined as the object of interest. Then, the output unit 14 outputs information of the displayed article decided as an object of information provision (S14). The processing is as described in "(4) processing of deciding and outputting an object of which information is provided" described above.

"Advantageous Effect"

The information provision system 10 according to the present example embodiment can output, toward a customer, information of a displayed article overlooked by the customer among objects of interest (displayed articles) to the customer, rather than provide information of all the objects of interest to the customer among the displayed articles present in a facility. The information provision system enables appropriately choosing an object of which information is to be provided to a customer from among displayed articles in which the customer is interested. Consequently, inconvenience that information is excessively output toward a customer can be prevented.

Further, according to the first to fourth output timing examples described above, information of a first displayed article can be provided to a customer when the customer is in a facility or at a timing of being not too far from the facility. Thus, the customer can visually recognize the overlooked first displayed article at a time of visiting the facility.

Further, according to the fifth to seventh output timing examples described above, there is a possibility that a customer cannot visually recognize an overlooked first displayed article at a time of visiting the facility. However, it is expected that the customer feels like going to the facility again by visually recognizing the overlooking.

Further, according to the seventh output timing example described above, information of a first displayed article can be output at a timing when a customer indicates interest in the first displayed article. Thus, it is expected that the customer more strongly feels like going to the facility again.

Second Example Embodiment

A decision unit 13 according to a present example embodiment can decide a displayed article of which information is provided to a customer, based on a result of determination of a determination unit 11, a result of estimation of an estimation unit 12, and facility setting information indicating a displayed article that a customer is expected by a facility to visually recognize.

Figure 6:
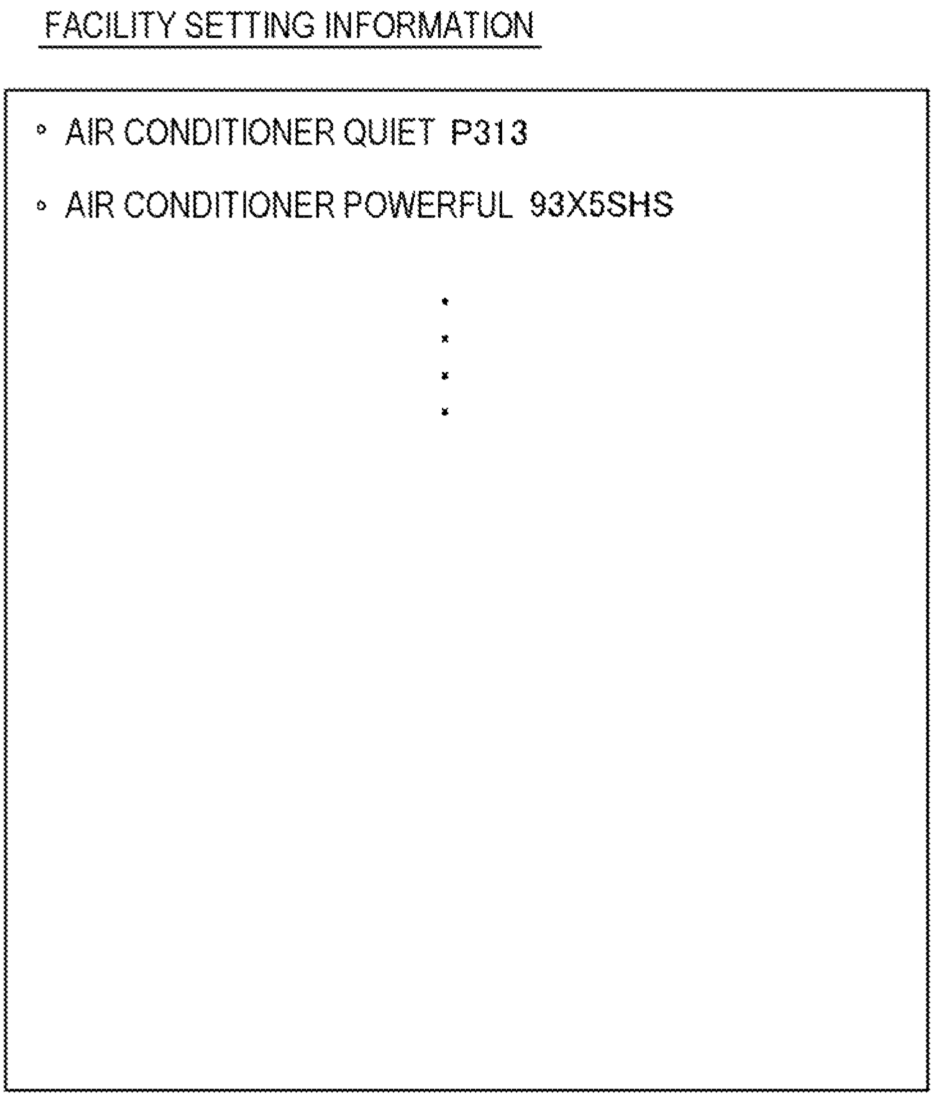
FIG. 6 is a diagram schematically illustrating one example of information processed by the information provision system according to the present example embodiment.

FIG. 6 illustrates one example of the facility setting information. The illustrated facility setting information is a list of displayed articles that a customer is expected by a facility to visually recognize. In a case of the example, the decision unit 13 decides, as a first displayed article of which information is provided, a "displayed article not visually recognized by each customer" among a group of displayed articles including a "displayed article determined as an object of interest" and a "displayed article registered in the facility setting information".

FIG. 7 illustrates another example of the facility setting information. The illustrated facility setting information is a list of displayed articles that a customer is expected by a facility to visually recognize, in which a customer target demographic is associated with each displayed article. The customer target demographic is a demographic of customers expected to visually recognize each displayed article, and is defined by age or gender. In a case of the example, the decision unit 13 first determines a displayed article targeting each customer from among pieces of the facility setting information, based on the facility setting information and member information. Then, the decision unit 13 decides, as a first displayed article of which information is provided, a "displayed article not visually recognized by each customer" among a group of displayed articles including a "displayed article determined as an object of interest" and a "displayed article registered in the facility setting information and targeting each customer".

Other configurations of an information provision system 10 are similar to the first example embodiment.

The information provision system 10 according to the present example embodiment achieves an advantageous effect similar to the first example embodiment. Further, when a customer overlooks a displayed article that a customer is expected by a facility to visually recognize, information of the displayed article can be output. Thus, this enables promoting a featured product prepared by a facility, a product for sales expansion, and the like.

Third Example Embodiment

An output unit 14 according to a present example embodiment can provide information of a first displayed article to a facility side. For example, the output unit 14 may cause a storage apparatus accessible by a manager of a facility to store history information of a first displayed article decided as an object of information provision. The history information includes identification information (a product name, an artwork name, or the like) of a displayed article that is not visually recognized and overlooked, a date on which the displayed article is overlooked, a display position, an attribute (a gender, an age, or the like) of a customer who overlooks the displayed article, and the like.

A facility can recognize, based on the information, an easily overlooked display position, an attribute of a customer who easily overlooks, a display position easily overlooked by a customer having a predetermined attribute, and the like. In addition, this can be used for optimized layout of display or the like.

Other configurations of an information provision system 10 are similar to the first and second example embodiments.

The information provision system 10 according to the present example embodiment achieves an advantageous effect similar to the first and second example embodiments. Further, the information provision system 10 according to the present example embodiment can not only provide information generated by the information provision system 10 to a customer, but also effectively use the information in a facility. For example, a facility can recognize, based on the information, an easily overlooked display position, an attribute of a customer who easily overlooks, a display position easily overlooked by a customer having a predetermined attribute, and the like. In addition, this can be used for optimized layout of display or the like.

Fourth Example Embodiment

An information provision system 10 according to a present example embodiment can provide a service described in the first to third example embodiments to not only a member but also a non-member whose member information is not preliminarily registered.

First, in "(1) processing of determining and managing a customer coming to a facility", when a determination unit 11 fails in authentication based on information acquired by an information acquisition apparatus and information (member information, see FIG. 3) of a customer already registered as a member (when the customer is not a member), the determination unit 11 acquires a face image of the customer (non-member) generated by a camera installed in a facility. Then, the determination unit 11 issues new non-member identification information, and causes a storage unit 15 to store the non-member identification information and face information (the face image or a feature value of a face appearance) of the customer in association with each other. Further, the determination unit 11 registers, as customer identification information, the non-member identification information in customer-in-facility management information for managing a customer in the facility.

Next, in "(2) processing of determining an object of interest to a customer", the determination unit 11 determines an object of interest to the non-member (the customer coming to the facility), based on at least either "(2-4) fourth processing example" or "(2-5) fifth processing example". When "(2-4) fourth processing example" is used, the determination unit 11 estimates an attribute (an age or a gender) of the non-member, based on the face image of the non-member. Then, the determination unit 11 determines an object of interest to the non-member to be processed, based on a past purchase history, preference information, and/or a content of interest to another customer (member) whose attribute is similar to the estimated attribute (a gender or an age group) of the non-member to be processed.

Next, in "(4) processing of deciding and outputting an object of which information is provided", information of a first displayed article is output toward the non-member via an output apparatus installed in the facility. For example, an output unit 14 can output information of a first displayed article toward the non-member, based on any of "(4-1) first output timing example" to "(4-4) fourth output timing example". Output of information is achieved via an output apparatus installed in the facility.

Other configurations of the information provision system 10 are similar to the first to third example embodiments.

The information provision system 10 according to the present example embodiment achieves an advantageous effect similar to the first to third example embodiments. Further, the information provision system 10 according to the present example embodiment can output information of a first displayed article toward not only a customer registered in advance as a member but also a customer not registered as a member. Since useful information can be provided toward not only a member but also a non-member, an advantageous effect such as improvement in customer satisfaction is expected.

While the example embodiments of the present invention have been described with reference to the drawings, the example embodiments are illustrative of the present invention, and various configurations other than the above can be employed.

Note that, "acquisition" in the present description includes at least one of "fetching (active acquisition), by an own apparatus, data stored in another apparatus or storage medium" based on a user input or based on an instruction of a program, for example, requesting or inquiring another apparatus to receive data, accessing another apparatus or storage medium to read out data therefrom, or the like, and "inputting (passive acquisition), to an own apparatus, data output from another apparatus" based on a user input or based on an instruction of a program, for example, receiving delivered (transmitted, push-notified, or the like) data, selectively acquiring received data or information, and "acquiring new data generated by editing data (such as conversion to a text, sorting of data, extraction of some data, or change of a file format) or the like".

Further, while a plurality of processes (pieces of processing) are described in order in a plurality of flowcharts used in the above description, execution order of processes executed in each example embodiment is not limited to the described order. The order of the illustrated processes can be changed in each example embodiment, as long as the change does not detract from contents. Further, the above example embodiments can be combined, as long as contents do not contradict each other.

The whole or part of the above-described example embodiments can be described as, but not limited to, the following supplementary notes.

1. An information provision system including:

a determination unit that determines an object of interest to a customer present in a facility among displayed articles present in the facility, based on attribute information of the customer;

an estimation unit that estimates the displayed article visually recognized by the customer, based on a content of behavior of the customer in the facility;

a decision unit that decides the displayed article of which information is provided to the customer, based on a result of the determination and a result of the estimation; and an output unit that outputs information of the displayed article decided as an object of information provision.

2. The information provision system according to supplementary note 1, wherein the decision unit decides, as the displayed article of which information is provided, the displayed article not visually recognized by the customer among the displayed articles determined as the object of interest.

3. The information provision system according to supplementary note 1 or 2, wherein the attribute information includes at least one of a past purchase history of the customer, preference information of the customer generated from the purchase history, a content of interest registered by the customer, the purchase history of another customer whose predetermined attribute is similar to the customer, the preference information of the another customer, the content of interest to the another customer, and a content of behavior of the customer in the facility.

4. The information provision system according to any one of supplementary notes 1 to 3, wherein the determination unit further determines, based on the attribute information, a timing when the customer indicates interest in the displayed article determined as the object of interest, and the output unit outputs information of the displayed article at a timing when the customer indicates interest in the displayed article determined as the object of interest.

5. The information provision system according to supplementary note 4, wherein the determination unit determines a timing when the customer indicates interest in the displayed article determined as the object of interest, based on at least either the purchase history of the customer or an event day registered by the customer.

6. The information provision system according to any one of supplementary notes 1 to 5, wherein the estimation unit estimates the displayed article visually recognized by the customer, based on at least one of a line of movement, a line of sight, and an orientation of a face of the customer.

7. The information provision system according to any one of supplementary notes 1 to 6, wherein the output unit outputs information of the displayed article decided as an object of information provision at a timing of at least one of a timing of detecting the customer passing in front of a display position of the displayed article decided as an object of information provision, a timing of detecting the customer leaving from the facility, a timing of detecting a customer who has finished an activity of visually recognizing the displayed article in the facility at a predetermined position where the customer is to pass, a timing of detecting that a distance between a display position of the displayed article decided as an object of information provision and a customer is within a reference distance, and that a duration of a state of not detecting the customer visually recognizing the displayed article reaches a reference period of time, a predetermined time of a day when the customer comes to the facility, a predetermined time of a predetermined day, and a timing when the customer indicates interest in the displayed article decided as an object of information provision, determined based on the attribute information.

8. The information provision system according to any one of supplementary notes 1 to 7, wherein the output unit outputs information of the displayed article toward the customer or a manager of the facility.

9. An information provision method including, by a computer:

determining an object of interest to a customer present in a facility among displayed articles present in the facility, based on attribute information of the customer;

estimating the displayed article visually recognized by the customer, based on a content of behavior of the customer in the facility;

deciding the displayed article of which information is provided to the customer, based on a result of the determination and a result of the estimation; and outputting information of the displayed article decided as an object of information provision.

10. A program causing a computer to function as:

a determination unit that determines an object of interest to a customer present in a facility among displayed articles present in the facility, based on attribute information of the customer;

an estimation unit that estimates the displayed article visually recognized by the customer, based on a content of behavior of the customer in the facility;

a decision unit that decides the displayed article of which information is provided to the customer, based on a result of the determination and a result of the estimation; and an output unit that outputs information of the displayed article decided as an object of information provision.

REFERENCE SIGNS LIST

10 Information provision system
11 Determination unit
12 Estimation unit
13 Decision unit
14 Output unit
15 Storage unit

What is claimed is:

1. An information provision system comprising:

one or more sensors disposed in a facility;

at least one memory configured to store one or more instructions; and at least one processor configured to execute the one or more instructions to:

perform authentication of a customer present in the facility and acquire attribute information for the customer;

determine, among displayed articles present in the facility, displayed articles determined as an object of interest to the customer based on the attribute information of the customer present in the facility;

determine, among the displayed articles present in the facility, articles having been visually recognized in the facility by the customer, based on behavior of the customer detected by the one or more sensors in the facility;

determine, among the displayed articles determined as the object of interest to the customer, one or more articles not having been visually recognized by the customer in the facility based on the displayed articles determined as the object of interest to the customer and the articles determined to have been visually recognized in the facility by the customer;

select, as a target display article, the one or more articles among the displayed articles determined as the object of interest to the customer that have been determined to have not been visually recognized by the customer in the facility, and control a device to output, to the customer, information only of the target display article to notify the customer of articles of interest to the customer that were overlooked by the customer.

2. The information provision system according to claim 1, wherein the attribute information includes at least one of a past purchase history of the customer, preference information of the customer generated from the past purchase history, a content of interest registered by the customer, the past purchase history of another customer whose predetermined attribute is similar to the customer, the preference information of the another customer, the content of interest to the another customer, and a content of behavior of the customer in the facility.

3. The information provision system according to claim 1, wherein the processor is further configured to execute the one or more instructions to:

determine, based on the attribute information, a timing when the customer indicates interest in the displayed articles determined as the object of interest, and output the information of the target display article at the timing when the customer indicates interest in the displayed articles determined as the object of interest.

4. The information provision system according to claim 3, wherein the processor is further configured to execute the one or more instructions to determine the timing when the customer indicates interest in the displayed articles determined as the object of interest, based on at least either a purchase history of the customer or an event day registered by the customer.

5. The information provision system according to claim 1, wherein the processor is further configured to execute the one or more instructions to determine the articles as having been visually recognized by the customer, based on at least one of a line of movement, a line of sight, and an orientation of a face of the customer.

6. The information provision system according to claim 1, wherein the processor is further configured to execute the one or more instructions to:

output the information of the target display article at a timing of at least one of a timing of detecting the customer passing in front of a display position of the target display article, a timing of detecting the customer leaving from the facility, a timing of detecting another customer who has finished an activity of visually recognizing the target displayed article in the facility at a predetermined position where the customer is to pass, a timing of detecting that a distance between the display position of the target displayed article and the customer is within a reference distance, and that a duration of a state of not detecting the customer visually recognizing the target displayed article reaches a reference period of time, a predetermined time of a day when the customer comes to the facility, a predetermined time of a predetermined day, and a timing when the customer indicates interest in the target displayed article, determined based on the attribute information.

7. The information provision system according to claim 1, wherein the processor is further configured to execute the one or more instructions to output the information of the target displayed article toward a manager of the facility to notify the manager of the facility of the target display article that was overlooked by the customer.

8. An information provision method comprising, by a computer:

performing authentication of a customer present in the facility and acquiring attribute information for the customer;

determining, among displayed articles present in the facility, displayed articles determined as an object of interest to the customer based on the attribute information of the customer present in the facility;

determining, among the displayed articles present in the facility, articles having been visually recognized in the facility by the customer, based on behavior of the customer detected by one or more sensors in the facility;

determining, among the displayed articles determined as the object of interest to the customer, one or more articles not having been visually recognized by the customer in the facility based on the displayed articles determined as the object of interest to the customer and the articles determined to have been visually recognized in the facility by the customer;

selecting, as a target display article, the one or more articles among the displayed articles determined as the object of interest to the customer that have been determined to have not been visually recognized by the customer in the facility; and controlling a device to output, to the customer, information only of the target display article to notify the customer of articles of interest to the customer that were overlooked by the customer.

9. A non-transitory storage medium storing a program executable by a computer to perform processing comprising:

performing authentication of a customer present in the facility and acquiring attribute information for the customer;

determining, among displayed articles present in the facility, displayed articles determined as an object of interest to the customer based on the attribute information of the customer present in the facility;

determining, among the displayed articles present in the facility, articles having been visually recognized in the facility by the customer, based on behavior of the customer detected by one or more sensors located in the facility;

determining, among the displayed articles determined as the object of interest to the customer, one or more articles not having been visually recognized by the customer in the facility based on the displayed articles determined as the object of interest to the customer and the articles determined to have been visually recognized in the facility by the customer;

selecting, as a target display article, the one or more articles among the displayed articles determined as the object of interest to the customer that have been determined to have not been visually recognized by the customer in the facility; and controlling an device to output, to the customer, information only of the target display article to notify the customer of articles of interest to the customer that were overlooked by the customer.

* * * * *